Oct. 1, 1940.  R. T. ANDERSON  2,216,658
PROCESS OF EXPRESSING OIL FROM OIL BEARING MATERIALS
Filed Aug. 1, 1936  2 Sheets-Sheet 1
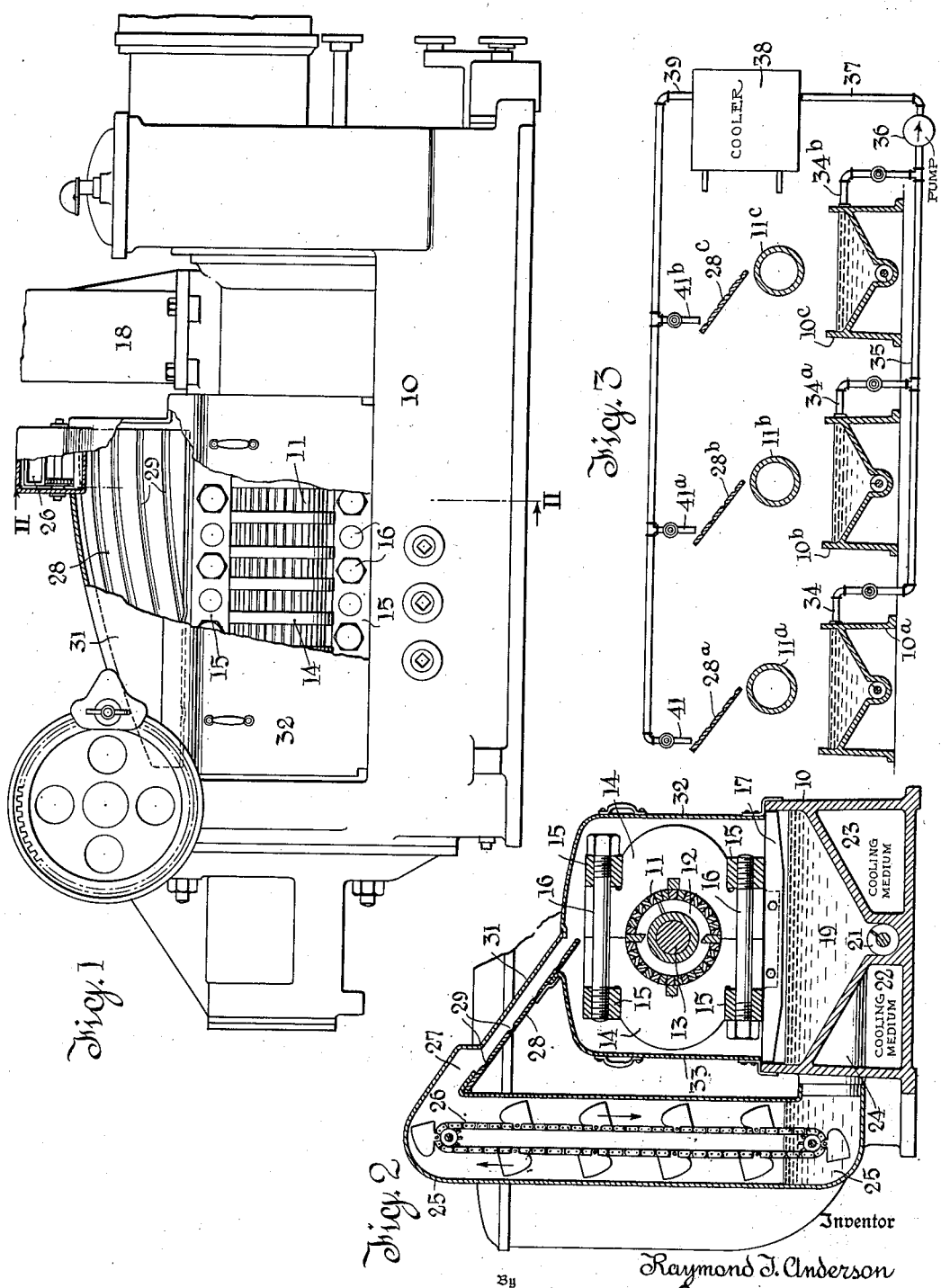
Inventor
Raymond T. Anderson
By Dodge and Sons,
Attorneys Oct. 1, 1940.  R. T. ANDERSON  2,216,658
PROCESS OF EXPRESSING OIL FROM OIL BEARING MATERIALS
Filed Aug. 1, 1936  2 Sheets-Sheet 2
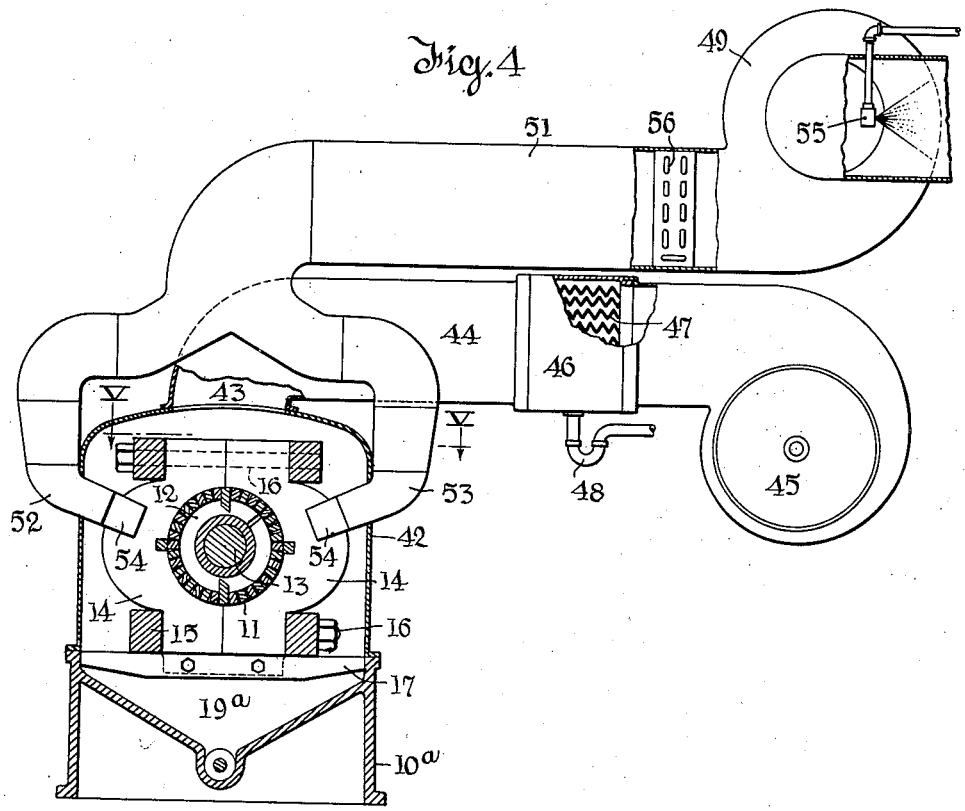
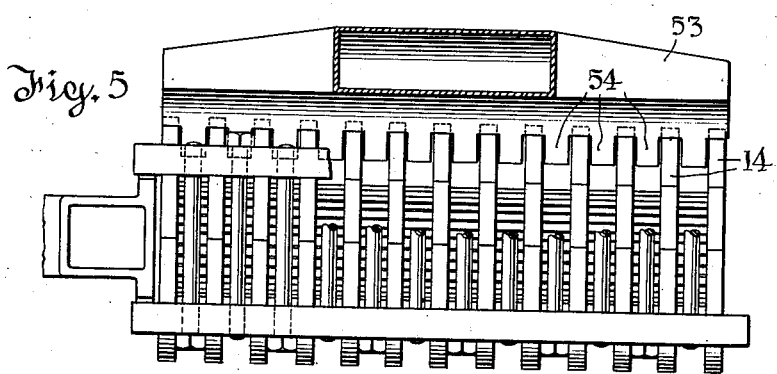
Inventor
Raymond T. Anderson
By Dodge and Sons
Attorneys Patented Oct. 1, 1940

2,216,658

UNITED STATES PATENT OFFICE 2,216,658

PROCESS OF EXPRESSING OIL FROM OIL BEARING MATERIALS

Raymond T. Anderson, Berea, Ohio, assignor to The V. D. Anderson Company, Cleveland, Ohio, a corporation of Ohio Application August 1, 1936, Serial No. 93,907

12 Claims. (Cl. 260—412)

This invention pertains to an improved process of expressing oil from vegetable growth, and more particularly from soya beans, or other proteinaceous oil bearing substances or materials.

The invention has for its main object, the production of a high-grade, light-colored oil from such materials, which may be readily employed for various purposes.

In a broad sense, the invention comprises a press in which the proteinaceous material is subjected to high compression, whereby the oil is expressed therefrom. Working in conjunction with said press is means for subjecting the body thereof to the action of a cooling medium, such as expressed oil or cooled air, which lowers the temperature of the press and maintains it at such a temperature that oil flowing from the material, particularly soya beans, will not be discolored.

In other words, in the utilization of a continuously operating mechanical press, wherein the material is subjected to high degree of pressure which increases as the material reaches the discharge of the press, high temperatures ordinarily prevail and the oil is discolored or darkened to such an extent as to render it unsuitable for certain uses. For instance, prime crude soya bean oil must be under 130 yellow and 36 red, while the trade demands that it be as close to 120 yellow and 24 red as is possible.

These colors are determined by the so-called Lovibond tintometer, which, as is well understood, is a colorimeter for comparing the color of a liquid with the standard coloring solution on a series of tinted slides.

I have found that by utilizing a press of the type shown in Letters Patent No. 1,773,771, issued to me under date of August 26, 1930, or presses of the same general type, wherein a plurality of separated worms or screws are mounted upon a shaft within a press barrel having small openings in the wall thereof, combined with means for retarding the outflow of the compressed material from which the oil has been expressed, and subjecting the exterior of the press mechanism, or more specifically the barrel of the press as well as the feed chute leading into the intake of the shell or barrel, to the action of a cooling medium, I can produce oil of the desired quality.

Not only is a superior oil produced, but owing to the fact that the proteins of the material undergoing treatment do not become as fluid as they do when the temperature is high, greater pressure may be exerted upon the mass without forcing such proteins outwardly through the passages or openings formed in the barrel for the outflow of oil.

The cake which is forced from the barrel past the choke has a lower oil content than would otherwise obtain which is, of course, an advantage and shows that a greater yield of oil is produced owing to the lowering of the temperature of the press and of the material passing therethrough. The cake is also of lighter color than that which passes from a press which is uncooled.

Various media may be employed for bathing the exterior of the press structure, so long as they do not contaminate the expressed oil.

In practice, I have found that air and oil may each be utilized. The oil may be that which is expressed and then cooled prior to its being showered upon and flowing over the press structure. So, too, the air may be cooled and likewise humidified prior to its being blown upon and around the press structure, means being provided to confine the air in its flow against and in direct contact with the press barrel or shell. Not only does the oil, or air, whichever is utilized, lower the temperature of the press and hold the temperature of the mass being forced through the structure at the desired and requisite point, but the flow of the oil or air over and around the press barrel also removes the foots, which is forced outwardly with the expelled oil. This keeps the exterior of the press barrel free of any accumulation, allowing the expressed oil to flow outwardly without impedance and what is perhaps more important, removes from the exterior surface of the press, material which has a tendency to insulate the structure against the full action of the temperature lowering media.

Several forms of apparatus capable of directing the cooling medium to and over the pressing mechanism are shown in the annexed drawings, wherein:

Figure 1 is a side elevation of so much of a press structure, with parts broken away, as is necessary to illustrate the means employed to shower or bathe the press barrel with cooled oil;

Fig. 2, a transverse sectional view on the line II—II of Fig. 1;

Fig. 3, a diagrammatic view illustrating a series of presses utilizing a common cooling unit for oil which may be led to one or more of the presses;

Fig. 4, a sectional elevation showing means for bathing or subjecting the press exterior to a continuously moving body of air; and Fig. 5, a horizontal sectional view on the line V—V of Fig. 4, with portions of the barrel structure broken away.

Referring first to the structure shown in Figs. 1 and 2, 10 denotes the frame of a press such as shown in the patent above referred to. 11 designates the barrel, composed of a series of bars preferably arranged in circular series and held in place with reference to each other and to the worms 12 (only one of which is shown) mounted upon a shaft 13. The bars 11 are held in position by heavy transversely extending spaced rib-like members 14, which are provided with semicircular seats to receive the bars, the ribs being held together by longitudinally extending pressure bars 15 which, in turn, are rigidly secured together in oppositely disposed pairs by threaded bolt-like members 16. The lowermost pair of longitudinally extending bars 15 rests upon guideways or tracks 17 extending transversely of the base portion 10; only one of said tracks is shown (see Fig. 2). The structure is that shown in the patent above referred to.

The material is introduced into the barrel at the head end of the machine through a chute 18, which may be of any desired form (Fig. 1). The choke of the press may be of the type disclosed in Patent No. 1,752,054, dated March 25, 1930, or of any approved type which provides for adjustment thereof.

The base of the frame 10 is formed into a trough 19 in the lower portion of which is mounted a worm 21 which may be rotated to remove any foots which may settle from the oil, said foots being carried outwardly of the press structure for further treatment or return to the feed chute for introduction into the press along with the material being fed thereto. The trough 19 maintains a bath of oil used for cooling purposes, and product oil is of course withdrawn in any suitable manner. Located in the lower portion of the base 10 beneath the trough 19 are chambers 22, 23, through which a cooling medium is circulated. This medium has the effect of chilling the oil which may flow from the trough through a lateral connection or conduit 24 and into the lower portion of a hollow leg 25 which extends upwardly therefrom to a point above the press structure proper. Within this leg is housed a bucket elevator 26 driven by any suitable means (not shown). The buckets at the upper end of the elevator discharge through an opening 27 onto a riffle board 28 which forms the lower element of a conduit extending from 27 downwardly and terminating in line with the longitudinal axis of the press structure proper. The various depressions or riffles 29 of the board 28 are so formed and contoured as to secure a substantially even distribution of the cooled oil onto and over the underlying press elements and then into the trough 19.

The cover plate 31 is disposed in spaced relation to the riffle board 28, said board and plate being supported by the proximate edges of the upper portion of two cover elements, 32 and 33, which are supported upon the frame 10 and extend upwardly to each side and over the upper portion of the press structure.

It will be readily appreciated that any suitable cooling medium may be employed to chill and lower the temperature of the oil in the trough 19, which cooled oil is picked up and carried to the riffle board and showered down upon the press barrel or shell. This has the effect of materially lowering the temperature of the shell and the associated elements and, consequently, lowers the temperature of the material being forced through the shell or barrel.

Not only does the oil cool the press structure as such but it washes the foots from the exterior of the shell, keeping it clean and maintaining the passages between the shell bars free of accumulated foots, which otherwise would have a tendency to gum up and "char" thereon. Again, by reason of the fact that the material in the barrel is cooled, the proteins are not as fluid as they would ordinarily be under usual temperature operating conditions. Hence, the mass as a whole which is being forced through the press is not so fluid and, consequently, the material will not pass the choke quite so readily and greater pressure may be exerted without fear of raising the temperature beyond the limit where optimum conditions obtain both as to the quantity and color of the oil. Furthermore, by reason of the higher pressures permissible at the lower operating temperatures, the cake which is extruded from the press has a very low oil content and is light in color.

It will be appreciated that instead of the elevator as shown in Fig. 2 for carrying the oil to the riffle board, a pump may be employed.

In Fig. 3, a series of presses is indicated generally by 11$^a$, 11$^b$, and 11$^c$, which are comparable to the press barrel 11 of Figs. 1 and 2. They are, of course, merely shown in a diagrammatic way, as are the other elements in this structure.

Located above and discharging upon each of the presses or their barrels is a riffle board, said boards being denoted by 28$^a$, 28$^b$, and 28$^c$, respectively. The oil which is gathered in the trough beneath each of the press barrels may be drawn off through lateral branches 34, 34$^a$, and 34$^b$, which branches are valved and open into a main 35 connected with a pump 36. The outlet of the pump is connected to a pipe 37 which passes into a cooler 38 of any approved form. The cooled or chilled oil passes outwardly into a main 39 provided with valved branches or nozzles 41, 41$^a$, and 41$^b$, which overlie and discharge upon the respective riffle boards.

As stated above, the showing in this figure is merely diagrammatic and a greater or less number of press elements may be present, or a single press member may be utilized in conjunction with the pump and the cooler. The cooling action of the oil is the same as that which obtains with the construction first described.

Instead of employing oil as the cooling medium, other fluid medium such as cooled air or gases may be utilized. A construction capable of utilizing air or gas as a cooling medium is shown in Figs. 4 and 5.

In this instance, the press shell is made up in the same manner as that heretofore described, and the oil which passes down into the trough as 19$^a$ below the barrel is carried off and the foots filtered therefrom.

Surmounting the base of the press 10$^a$ is a longitudinally extending casing 42 which is spaced away from the press structure and is provided at its top with an exhaust passage 43, from which extends a duct 44 connected at its end to an exhaust fan 45. Preferably, located within the duct 44 is an oil trap 46 of any suitable form, it being shown in the instant case as a series of baffle plates 47 which arrest the oil particles and permit them to gravitate to a trap 48.

It is designed to force air, preferably cooled, into the casing and directly against the barrel of the press. To this end, a fan 49 is connected with a duct 51 which, in turn, is interconnected by branches with headers or manifolds 52 and 53 located upon opposite sides of the enclosing shell or casing 42. Each manifold at its lower end has a series of nozzles 54 extending therefrom, which nozzles preferably extend inwardly between the rib-like members 14 of the press structure.

The intake of the fan 49 may be provided with a spray head 55 to humidify, just under the dew point, the air which is being forced through the duct 51 and through the nozzles 54 into direct contact with the press shell, that is, into contact with the means employed to compress the material. Thus, evaporation of the moisture by contact with the press bars tends to lower the temperature of such bars over that which would obtain were dry air merely forced thereagainst.

If need be, the air may be cooled by placing cooling coils or means, as 56, in any suitable position within the passages formed for the delivery of air to the press barrel or shell.

It will, of course, be appreciated that when the air is cooled, it will not be moistened, for otherwise the moisture would condense upon the cooling coil. Where the air is moistened, such moistened air when it contacts the bars of the barrel will assist in lowering the temperature thereof owing to the evaporation of the moisture in the air.

The air passing from the nozzles 54 comes into direct contact with the press barrel and cools the same. Not only does it cool the barrel, but it tends to blow any accumulation of foots off of the same and thus, to keep the space between the barrel bars free for the passage of the expressed oil. It also maintains the temperature at such point that charring of the foots will not occur.

To illustrate the advantages of the various forms of apparatus herein described and the method which may be effected thereby, it may be pointed out that when operating a press at high capacity and without any cooling of the press barrel, the oil showed a color of 800 yellow and 340 red. In operating in accordance with the present process, it is found essential that the temperature of the barrel bars be kept approximately at 300° F. or lower, and by bathing or flooding the barrel externally with cooled air or cooled oil, in the manner above described, I am able to keep the temperature of the bars at approximately 265° F.

With the higher temperatures which prevail when presses of the type above described, or in other words when a continuously operating mechanical press is employed without the cooling means of the present invention, the temperature of the barrel was found to be 350° F. after removal of the foots therefrom.

It has been found by experimentation that when treating soya beans a temperature of about 300° F. starts to darken the material that is pressed out with the oil and it is, therefore, essential that the barrel be maintained at a temperature below 300° F. As just above noted, I am enabled by the method above described, to lower the temperature of the bars to 265° F. and maintain them at that point or lower. This lowering of the temperature insures the production of an oil having the requisite color index as above described.

Where soya beans are being treated for the expulsion of oil, they will preferably be heated prior to their entrance into the press, to approximately 270° F.

What is claimed is:

1. The herein described method of expelling oil from proteinaceous oil bearing materials, which consists in subjecting such material to a high degree of pressure by the action of a continuously operating mechanical press, and simultaneously preventing an undue rise in temperature of the mass undergoing treatment which would otherwise obtain due to the action of the compression thereof, by flowing a bath of precooled fluid medium directly over and in intimate contact with the exterior of the means employed to compress the material, whereby the temperature of said means and the material being acted upon thereby are maintained at a temperature sufficiently low as not to adversely affect the character of the expressed oil nor to char or scorch the extruded foots carried outwardly by and with the oil, said flowing fluid medium likewise acting to remove and thereby to prevent scorching of the foots upon the exterior surface of the compressing means of the press.

2. That method of treating proteinaceous oil bearing materials for the expulsion of oil therefrom, which consists in subjecting the same to the action of a continuously operating mechanical press, and during such action flooding the exterior surface of the press with a precooled fluid cooling medium flowing directly and forcibly against the exterior of the press barrel, whereby the foots carried outwardly with the oil are washed off the outer surface of the press barrel, and the press and the material undergoing compression therein are maintained at a temperature sufficiently low as to inhibit any substantial discoloration of the oil and scorching of the foots carried outwardly of the press by the oil.

3. That method of expelling oil from proteinaceous oil bearing materials, which consists in subjecting the material to the compressive action of a continuously operating mechanical press, and simultaneously washing the exterior of the press barrel with a fluid cooling medium flowing directly and forcibly thereagainst, whereby the temperature of the press is controlled and the foots which are carried outwardly by the oil are washed from the exterior of the barrel and charring of the foots is prevented, thereby assuring the production of a light colored oil.

4. That method of expelling oil from proteinaceous oil bearing materials, which consists in subjecting the material to the compressive action of a continuously operating mechanical press and simultaneously washing the exterior of the press by flowing oil expressed from the material over the exterior of the press, which oil is cooled, whereby the temperature of the press is controlled and the foots which are carried outwardly by the oil are washed from the exterior of the press and charring of said foots is prevented.

5. That method as set forth in claim 3, wherein the cooling medium is air which is blown directly against and about the exterior of the press barrel.

6. That method of treating proteinaceous oil bearing materials for the expulsion of oil therefrom, which consists in initially heating said material, and thereafter subjecting the heated material to a continuous mechanical pressure and maintaining the temperature of the mass below 300° F. while undergoing such pressure, by flooding the exterior of the press barrel with a fluid cooling medium flowing directly against and about the same, which medium likewise maintains the exterior surface of the barrel free of the accumulation of foots carried outwardly to said surface by the expressed oil and which foots would otherwise collect upon the barrel and become charred and discolor the expelled oil.

7. That method of treating proteinaceous oil bearing materials with a view of expelling the oil therefrom, which consists in initially heating the material, thereafter subjecting the same while still hot to the compressive action of a continuously operating mechanical press, and simultaneously inhibiting the rise in temperature in the mass undergoing compression above 300° F., by forcing a precooled fluid medium directly over and in contact with the exterior surface of the press barrel, which medium likewise maintains the exterior surface free of the accumulation of foots carried outwardly to said surface by the expressed oil, which foots otherwise remain upon said surface and char due to the heat generated by the pressing operation.

8. That method of expelling oil from proteinaceous oil bearing materials, which consists in initially heating the material, subjecting the said heated material to the compressive action of a continuously operating mechanical press, cooling a portion at least of the oil expressed from the material and flowing such cooled oil directly over and in contact with the exterior surface of the press barrel, whereby the temperature of the press and consequently the temperature of the material being forced therethrough under compression is maintained within a range such as not to adversely affect the desirable characteristics of the expressed oil and likewise so low as to preclude scorching of the foots carried thereby.

9. That method of expelling oil from proteinaceous oil bearing materials, which consists in subjecting the material to the compressive action of a continuously operating mechanical press, cooling a portion at least of the oil expressed from the material, and flowing such cooled oil directly over and in contact with the exterior surface of the press, whereby the temperature of the press and consequently the temperature of the material being forced therethrough under compression is maintained within a range such as not to adversely affect the desirable characteristics of the expressed oil and likewise so low as to preclude scorching of the foots carried thereby.

10. That method of treating proteinaceous oil bearing materials for the expulsion of oil therefrom, which consists in subjecting the same to the action of a continuously operating mechanical press, and during such action flooding the exterior surface of the press shell or barrel with a fluid cooling medium, said medium passing in direct contact with and over the exterior surface of said shell or barrel whereby the foots carried outwardly by the oil are washed off the outer surface of the shell or barrel by said medium and prevented from collecting on such surface, and the press and the material undergoing compression therein are maintained at a temperature sufficiently low to inhibit any substantial discoloration of the oil and scorching of the foots carried outwardly of the shell or barrel by the oil.

11. That method of treating proteinaceous oil bearing materials for the expulsion of oil therefrom, which consists in subjecting the material to the compressive action of a continuously operating mechanical press and simultaneously washing the exterior of the shell or barrel of the press with a fluid cooling medium caused to pass in direct contact with and over the exterior of the shell or barrel of the press, whereby the temperature of the press is controlled and the foots which are carried outwardly by the expressed oil are washed from the exterior of the barrel and charring thereof is prevented, thereby insuring the production of a light colored oil.

12. A method as set forth in claim 11, wherein the cooling medium is caused to pass through a confined space in which the press shell or barrel is enclosed, whereby a direct and flowing contact is maintained between such medium and the exterior of the shell or barrel at all times.

RAYMOND T. ANDERSON.